US012322274B2

(12) United States Patent
Xu

(10) Patent No.: US 12,322,274 B2
(45) Date of Patent: Jun. 3, 2025

(54) ALARM METHOD AND APPARATUS FOR DIGITAL ENHANCED CORDLESS TELECOMMUNICATIONS (DECT) TERMINAL, AND STORAGE MEDIUM

(71) Applicant: YEALINK (XIAMEN) NETWORK TECHNOLOGY CO., LTD., Fujian (CN)

(72) Inventor: Jinhui Xu, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 18/379,654

(22) Filed: Oct. 12, 2023

(65) Prior Publication Data

US 2024/0127689 A1 Apr. 18, 2024

(30) Foreign Application Priority Data

Oct. 12, 2022 (CN) ......................... 202211246968.3

(51) Int. Cl.
*G08B 25/00* (2006.01)
*G08B 25/01* (2006.01)
*G08B 25/10* (2006.01)

(52) U.S. Cl.
CPC ........... *G08B 25/018* (2013.01); *G08B 25/10* (2013.01)

(58) Field of Classification Search
CPC ..... G08B 25/018; G08B 25/10; G08B 25/016
USPC .......................................................... 340/524
See application file for complete search history.

(56) References Cited

U.S. PATENT DOCUMENTS

2014/0162598 A1* 6/2014 Villa-Real ............. G07F 7/0886 455/411
2016/0216130 A1* 7/2016 Abramson ......... G01C 21/3423
2018/0310159 A1* 10/2018 Katz ................. H04M 3/42161
2022/0159443 A1* 5/2022 Piantedosi ............ H04W 4/029
2022/0248204 A1* 8/2022 Anderson ............. H04W 4/029

* cited by examiner

*Primary Examiner* — Tai T Nguyen

(57) ABSTRACT

Disclosed are an alarm method and apparatus for a digital enhanced cordless telecommunications (DECT) terminal, and a storage medium. The method includes: when an alarm function of the DECT terminal is triggered, recording an account of the DECT terminal, matching an emergency contact based on the account of the DECT terminal, and establishing alarm communication with the emergency contact; and after establishing the alarm communication between the DECT terminal and the emergency contact, sending location information of a network base station connected to the DECT terminal to a device of the emergency contact, such that the device of the emergency contact obtains an alarm call of the DECT terminal and displays the location information of the network base station connected to the DECT terminal.

12 Claims, 5 Drawing Sheets

ALARM METHOD AND APPARATUS FOR DIGITAL ENHANCED CORDLESS TELECOMMUNICATIONS (DECT) TERMINAL, AND STORAGE MEDIUM

CROSS REFERENCE TO RELATED APPLICATIONS

The present application claims the benefit of Chinese Patent Application No. 202211246968.3 filed on Oct. 12, 2022, the contents of which are hereby incorporated by reference.

TECHNICAL FIELD

The present disclosure relates to the technical field of digital enhanced cordless telecommunications (DECT), and in particular, to an alarm method and apparatus for a DECT terminal, and a storage medium.

BACKGROUND

According to an emergency alarm technology of an existing DECT product, only an emergency alarm can be initiated by the DECT product. However, if an alarm reporting person cannot speak, an emergency contact cannot know a specific location of the alarm reporting person. In this case, positioning can be performed based on a mobile location service function of a third-party server. This method requires more money to purchase or rent the third-party server, instead of using an ordinary server, which does not have scalability. Alternatively, positioning can be performed through Bluetooth iBeacon. This also requires more money to purchase or rent the third-party server, and requires an additional iBeacon tag for positioning. This positioning method is more expensive, requiring both the third-party server and a device with a Bluetooth iBeacon function. An emergency alarm scheme of the existing DECT product is not convenient for users.

SUMMARY

The present disclosure provides an alarm method and apparatus for a DECT terminal, and a storage medium, to implement an emergency alarm scheme for a DECT terminal without relying on a third-party server.

To resolve the foregoing technical solution, an embodiment of the present disclosure provides an alarm method for a DECT terminal, including: when an alarm function of the DECT terminal is triggered, recording an account of the DECT terminal, matching an emergency contact based on the account of the DECT terminal, and establishing alarm communication with the emergency contact; and after establishing the alarm communication between the DECT terminal and the emergency contact, sending location information of a network base station connected to the DECT terminal to a device of the emergency contact, such that the device of the emergency contact obtains an alarm call of the DECT terminal and displays the location information of the network base station connected to the DECT terminal.

As a preferred solution, the present disclosure collects, through a DECT management system, location information of a network base station connected to a terminal of an alarm reporting person, without relying on Bluetooth, global positioning system (GPS) positioning, or other app functions that are only available on a smartphone. After communication between the terminal of the alarm reporting person and a device of an emergency contact is established, only using an ordinary Session Initiation Protocol (SIP) server, the DECT management system can transmit an alarm signal and location information of the alarm reporting person to the device of the emergency contact through a network base station connected to the device of the emergency contact.

As a preferred solution, before the alarm function of the DECT terminal is triggered, the alarm method for a DECT terminal further includes:

registering at least one network base station in the DECT management system, and setting information of the DECT terminal, a binding relationship between the DECT terminal and the emergency contact, and information and a corresponding alarm triggering mode of the device of the emergency contact.

As a preferred solution, the present disclosure registers the at least one network base station in the DECT management system in advance, and presets an account of the terminal and a binding relationship between the terminal and the emergency contact. After an alarm function of the terminal is triggered, the location information of the network base station connected to the terminal of the alarm reporting person and location information of the network base station connected to the device of the emergency contact can be quickly found based on the account of the terminal of the alarm reporting person in the DECT management system, without relying on a specific server, a Bluetooth function and a GPS positioning function of the terminal, or other app functions that are only available on the smartphone. Only using the ordinary SIP server, the DECT management system can transmit the alarm signal and the location information of the alarm reporting person to the device of the emergency contact through the network base station connected to the device of the emergency contact.

As a preferred solution, the DECT management system includes at least one DECT management subsystem, the emergency contact includes an emergency contact registered on a same DECT management subsystem and an emergency contact registered on a different DECT management subsystem, and the device of the emergency contact includes a terminal registered on the DECT management system and a remote desktop phone or handle.

As a preferred solution, when the server supports sending a location field, the location information of the network base station connected to the DECT terminal can be sent to a remote device of the emergency contact by the SIP. In this case, there may be no limitation on whether the device of the emergency contact needs to be registered on the DECT management system, and a lower deployment requirement is imposed for the device of the emergency contact. Therefore, the transmission of the alarm signal and the location information of the alarm reporting person is not limited to a device within a designated range of a DECT system, making the solution more scalable.

As a preferred solution, the sending location information of a network base station connected to the DECT terminal to a device of the emergency contact specifically includes:

after establishing alarm communication between the DECT terminal and any emergency contact, obtaining location information of a first network base station connected to the DECT terminal, and sending the location information to a second network base station connected to the device of the emergency contact, such that the second network base station sends the location information to the device of the emergency contact; and when the location information changes, sending latest location information to the second network base station connected to the device of the emergency contact, such that the second network base station sends the latest location information to the device of the emergency contact.

As a preferred solution, unlike an ordinary call of an ordinary DECT terminal, the alarm communication in this solution is established only after the alarm function is triggered. Through the establishment of the alarm communication, positioning information of the two terminals can be transmitted. However, the ordinary call cannot be used to transmit the positioning information. Moreover, when a location of the terminal of the alarm reporting person changes, signal strength of the network base station connected to the terminal of the alarm reporting person also changes. After recorded location information of a network base station with best signal strength and connected to the terminal of the alarm reporting person in the DECT management system changes, the DECT management system transmits new location information of the alarm reporting person to the device of the emergency contact through the network base station connected to the device of the emergency contact, thereby updating the location information of the alarm reporting person in real time.

As a preferred solution, the first network base station connected to the DECT terminal is a first network base station with best signal strength to which the DECT terminal is connected.

Correspondingly, the present disclosure further provides an alarm apparatus for a DECT terminal, including an alarm module and a location sending module, where the alarm module is configured to: when an alarm function of the DECT terminal is triggered, record an account of the DECT terminal, match an emergency contact based on the account of the DECT terminal, and establish alarm communication with the emergency contact; and the location sending module is configured to: after the alarm communication between the DECT terminal and the emergency contact is established, send location information of a network base station connected to the DECT terminal to a device of the emergency contact, such that the device of the emergency contact obtains an alarm call of the DECT terminal and displays the location information of the network base station connected to the DECT terminal.

As a preferred solution, the present disclosure collects, through a DECT management system, location information of a network base station connected to a terminal of an alarm reporting person. When an alarm function is triggered, the alarm module establishes alarm communication with an emergency contact. The location sending module only needs to use an ordinary SIP server to transmit an alarm signal and location information of the alarm reporting person to a device of the emergency contact through the network base station connected to the terminal of the alarm reporting person, without relying on Bluetooth, GPS positioning, or other app functions that are only available on a smartphone.

As a preferred solution, the alarm module includes an information registration unit; and the information registration unit is configured to register at least one network base station in the DECT management system, and set information of the DECT terminal, a binding relationship between the DECT terminal and the emergency contact, and information and a corresponding alarm triggering mode of the device of the emergency contact, where the DECT management system includes at least one DECT management subsystem, the emergency contact includes an emergency contact registered on a same DECT management subsystem and an emergency contact registered on a different DECT management subsystem, and the device of the emergency contact includes a terminal registered on the DECT management system and a remote desktop phone or handle.

As a preferred solution, the present disclosure registers the network base station in the DECT management system in advance, and presets an account of the terminal and a binding relationship between the terminal and the emergency contact. After the alarm function of the terminal is triggered, the location information of the network base station connected to the terminal of the alarm reporting person and location information of the network base station connected to the device of the emergency contact can be quickly found based on the account of the terminal of the alarm reporting person in the DECT management system, without relying on a specific server, a Bluetooth function and a GPS positioning function of the terminal, or other app functions that are only available on the smartphone. Only using the ordinary SIP server, the DECT management system can transmit the alarm signal and the location information of the alarm reporting person to the device of the emergency contact through the network base station connected to the device of the emergency contact. When the server supports sending a location field, the location information of the network base station connected to the DECT terminal can be sent to a remote device of the emergency contact by the SIP. In this case, there may be no limitation on whether the device of the emergency contact needs to be registered on the DECT management system, and a lower deployment requirement is imposed for the device of the emergency contact. Therefore, the transmission of the alarm signal and the location information of the alarm reporting person is not limited to a device within a designated range of a DECT system, making the solution more scalable.

As a preferred solution, the location sending module includes an initial location sending unit and a location update unit, where the initial location sending unit is configured to: after the alarm communication between the DECT terminal and the emergency contact is established, obtain location information of a first network base station connected to the DECT terminal, and send the location information to a second network base station connected to the device of the emergency contact, such that the second network base station sends the location information to the device of the emergency contact; and the location update unit is configured to: when the location information changes, send latest location information to the second network base station connected to the device of the emergency contact, such that the second network base station sends the latest location information to the device of the emergency contact.

As a preferred solution, unlike an ordinary call of an ordinary DECT terminal, the alarm communication in the alarm module in this solution is established only after the alarm function is triggered. Through the establishment of the alarm communication, positioning information of the terminal of the alarm reporting person can be transmitted. However, the ordinary call cannot be used to transmit the positioning information. Moreover, when a location of the terminal of the alarm reporting person changes, signal strength of the network base station connected to the terminal of the alarm reporting person also changes. After recorded location information of a network base station with best signal strength and connected to the terminal of the alarm reporting person in the DECT management system changes, the DECT management system transmits the alarm signal and new location information of the alarm reporting person to the device of the emergency contact through the network base station connected to the device of the emergency contact, thereby updating the location information of the alarm reporting person in real time.

As a preferred solution, the first network base station connected to the DECT terminal is a first network base station with best signal strength to which the DECT terminal is connected.

Correspondingly, the present disclosure further provides a computer-readable storage medium. The computer-readable storage medium includes a stored computer program, and the computer program is run to control a device on which the computer-readable storage medium is located to perform the alarm method for a DECT terminal in the present disclosure.

DETAILED DESCRIPTION

The technical solutions of the embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts should fall within the protection scope of the present disclosure.

Embodiment 1

Figure 1:
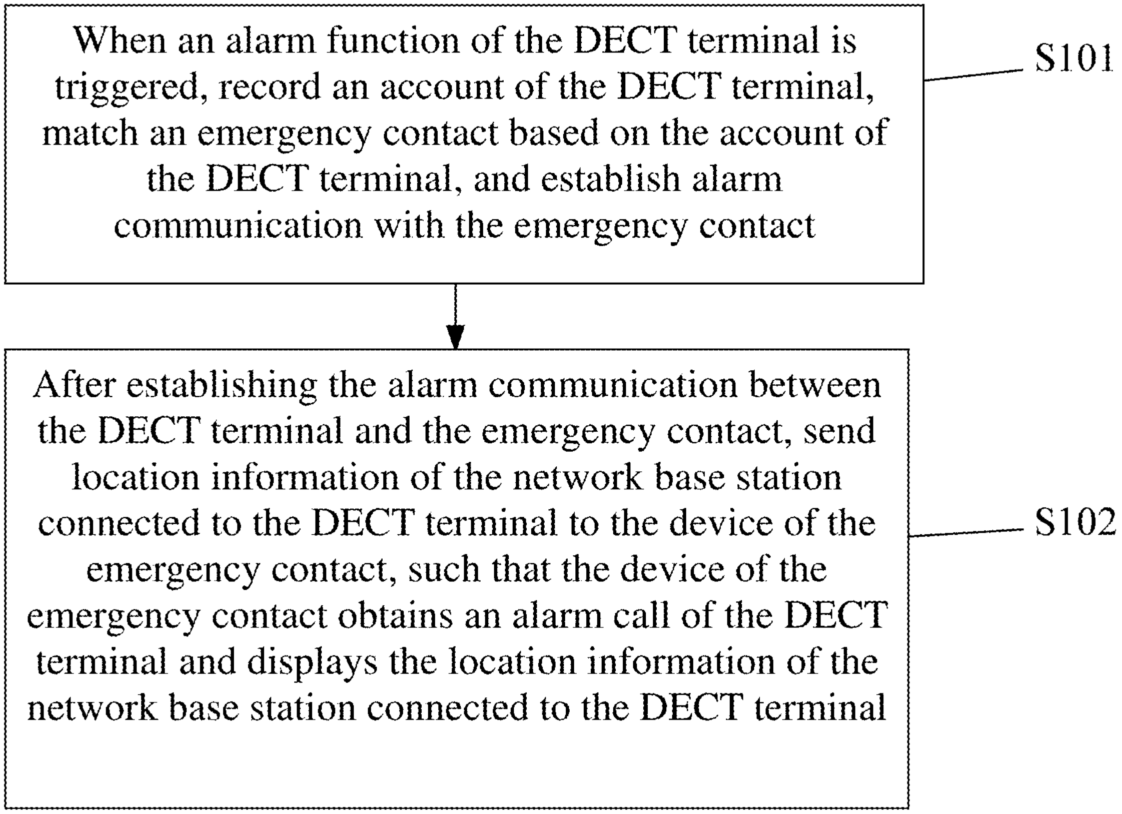
FIG. 1 is a schematic flowchart of an alarm method for a DECT terminal according to an embodiment of the present disclosure.
Figure 3:
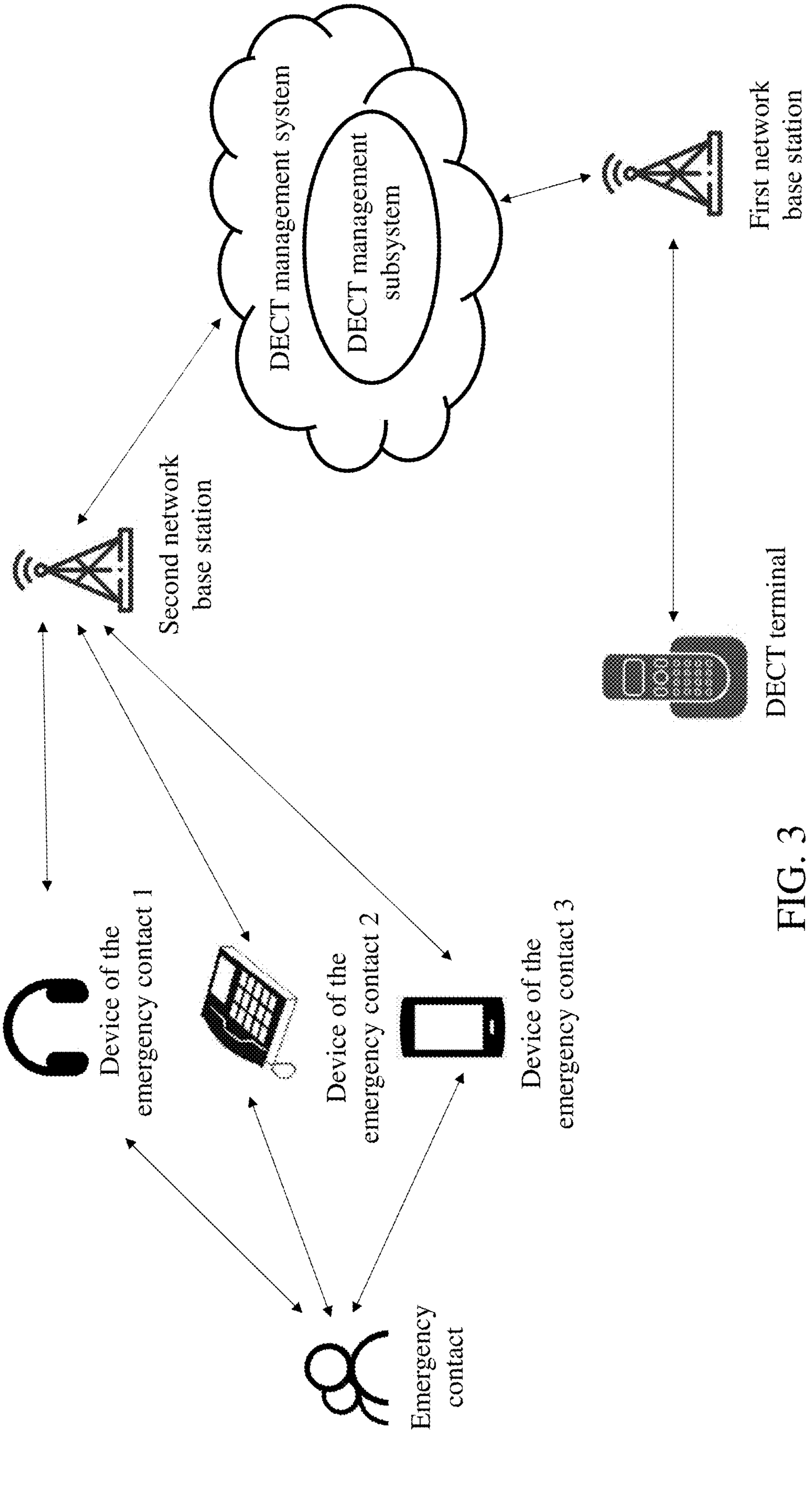
FIG. 3 is a first schematic diagram of an application scenario of an alarm method for a DECT terminal according to an embodiment of the present disclosure.

Referring to FIG. 1 and FIG. 3, an alarm method for a DECT terminal according to an embodiment of the present disclosure includes following steps S101 and S102.

Step S101: When an alarm function of the DECT terminal is triggered, record an account of the DECT terminal, match an emergency contact based on the account of the DECT terminal, and establish alarm communication with the emergency contact.

In this embodiment, before the alarm function of the DECT terminal is triggered, the alarm method for a DECT terminal further includes:

registering at least one network base station in a DECT management system, and setting information of the DECT terminal, a binding relationship with the emergency contact, and information of a device of the emergency contact.

In this embodiment, a web page of the DECT management system is logged in to register the at least one network base station, and set the information of the DECT terminal, a binding relationship between the DECT terminal and the device of the emergency contact, and the information and a corresponding alarm triggering mode of the device of the emergency contact.

In this embodiment, preferably, before registering all network base stations in the DECT management system, the alarm method for a DECT terminal further includes: deploying all the network base stations, with a distance between two network base stations not exceeding 50 meters.

In this embodiment, methods for triggering the alarm function include but are not limited to manual triggering and triggering based on a gyroscope sensor. The triggering based on the gyroscope sensor includes detection of immobility, falling, and rapid movement of an alarm reporting person by the gyroscope sensor of the DECT terminal.

In this embodiment, when the alarm function of the DECT terminal is triggered, the account of the DECT terminal is recorded, and based on the account of the DECT terminal and the information of the device of the set emergency contact in the DECT management system, alarm communication with the device of the emergency contact is established, such that a network base station connected to the DECT terminal establishes a connection to a network base station connected to the device of the emergency contact.

Preferably, the alarm communication includes but is not limited to an alarm call that can be used to transmit location information.

Preferably, the DECT terminal includes but is not limited to a DECT handle.

Figure 4:
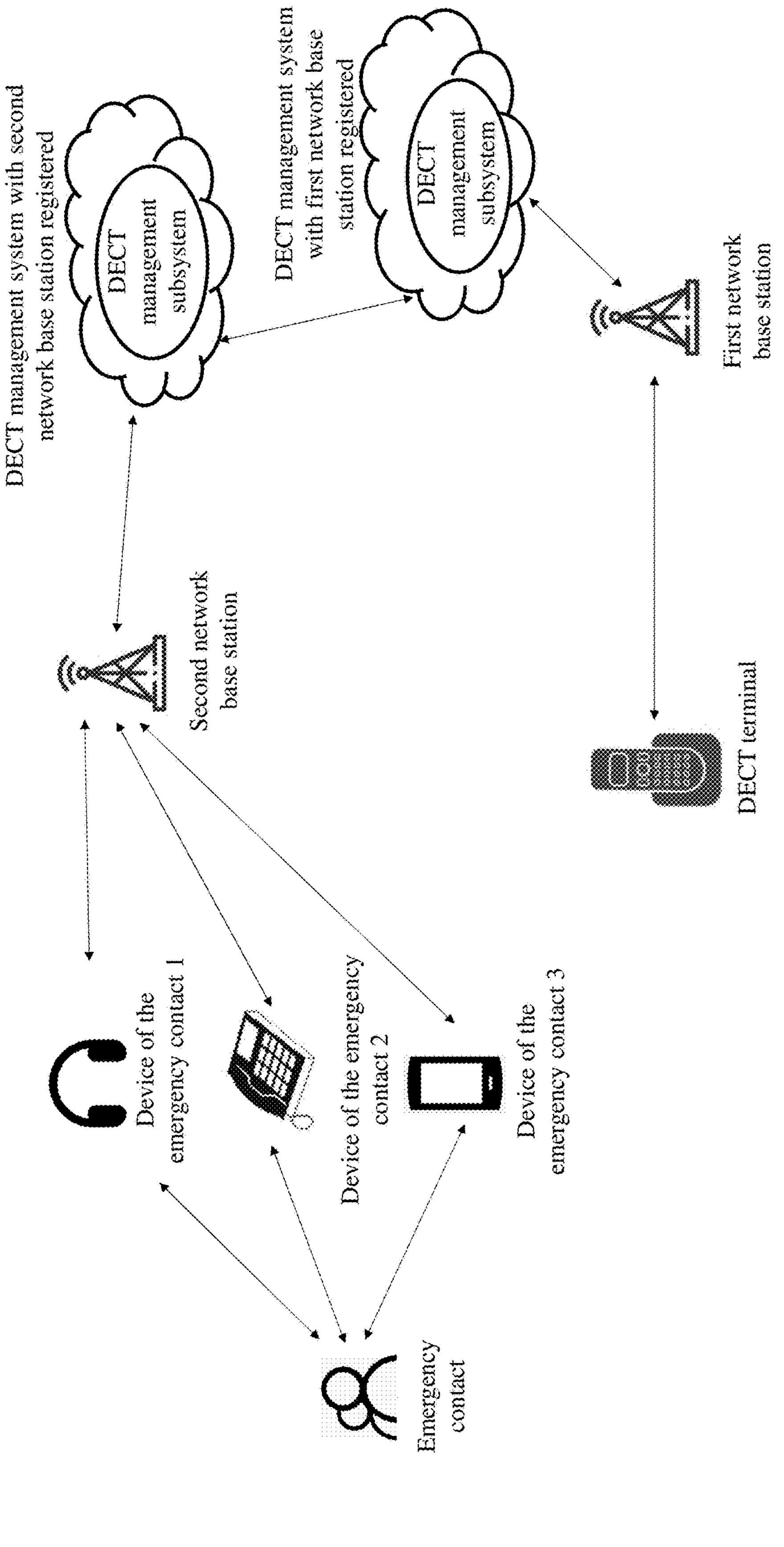
FIG. 4 is a second schematic diagram of an application scenario of an alarm method for a DECT terminal according to an embodiment of the present disclosure.

In this embodiment, referring to FIGS. 3 and 4, the DECT management system includes at least one DECT management subsystem, the emergency contact includes an emergency contact registered on a same DECT management subsystem and an emergency contact registered on a different DECT management subsystem, and the device of the emergency contact includes a terminal registered on the DECT management system and a remote desktop phone or handle.

Preferably, the device of the emergency contact also includes the remote desktop phone or handle. A remote device may be a device registered on a remote base station, a remote DECT management system, or a remote server. When the device of the emergency contact is the remote device, the DECT terminal establishes alarm communication with the remote device of the emergency contact through a local server and a remote server. Specifically, the alarm communication of the local DECT terminal is sent to the remote server through the local server and then to the remote device of the emergency contact.

In this embodiment, when the network base station connected to the device of the emergency contact is registered on the DECT management system, the device of the emergency contact is registered on the DECT management system. When the device of the emergency contact is the remote desktop phone or handle, the device of the emergency contact is registered on the corresponding remote base station, remote DECT management system, or remote server.

Step S102: After establishing the alarm communication between the DECT terminal and the emergency contact, send location information of the network base station connected to the DECT terminal to the device of the emergency contact, such that the device of the emergency contact obtains an alarm call of the DECT terminal and displays the location information of the network base station connected to the DECT terminal.

In this embodiment, the sending location information of the network base station connected to the DECT terminal to the device of the emergency contact specifically includes:

after establishing alarm communication between the DECT terminal and any emergency contact, obtaining location information of a first network base station connected to the DECT terminal, and sending the location information to a second network base station connected to the device of the emergency contact, such that the second network base station sends the location information to the device of the emergency contact.

In this embodiment, the network base station connected to the DECT terminal may be a first network base station with best signal strength and connected to the DECT terminal. After the alarm communication between the DECT terminal and the any emergency contact is established, location information of the first network base station with the best signal strength and connected to the DECT terminal is obtained and sent to the second network base station connected to the device of the emergency contact, such that the second network base station sends the location information to the device of the emergency contact.

Further, after the alarm communication between the DECT terminal and the any emergency contact is established, the location information of the first network base station with the best signal strength and connected to the DECT terminal is obtained. The DECT management system sends the location information to the second network base station connected to the device of the emergency contact, such that the second network base station sends the location information to the device of the emergency contact.

When the location information changes, latest location information is sent to the second network base station connected to the device of the emergency contact, such that the second network base station sends the latest location information to the device of the emergency contact.

Further, after the alarm communication between the DECT terminal and the any emergency contact is established, the DECT management system obtains, based on a preset condition, the location information of the first network base station with the best signal strength and connected to the DECT terminal, and sends the latest location information to the second network base station connected to the device of the emergency contact when the location information changes. In this way, the second network base station sends the latest location information to the device of the emergency contact.

Preferably, that the DECT management system obtains, based on a preset condition, the location information of the first network base station with the best signal strength and connected to the DECT terminal is specifically as follows:

the DECT management system obtains, every preset time, the location information of the first network base station with the best signal strength and connected to the DECT terminal.

Preferably, that the DECT management system obtains, based on a preset condition, the location information of the first network base station with the best signal strength and connected to the DECT terminal may alternatively be as follows: when receiving an obtaining instruction, the DECT management system obtains the location information of the first network base station with the best signal strength and connected to the DECT terminal.

Further, the first network base station with the best signal strength and connected to the DECT terminal may be a network base station with which the DECT terminal initially registers, or may be a network base station with which the DECT terminal re-registers after the DECT terminal moves.

Further, the first network base station with the best signal strength and connected to the DECT terminal may be a closest network base station to the connected DECT terminal.

Preferably, the first network base station and the second network base station may be a same network base station. In this case, the location information that is of the network base station connected to the DECT terminal and displayed by the device of the emergency contact after receiving the alarm communication is a location of the network base station connected to the device of the emergency contact, so as to prompt the emergency contact to increase alertness and pay more attention to an alarm triggering situation in a surrounding environment.

Preferably, after establishing the alarm communication between the DECT terminal and the emergency contact, the alarm method for a DECT terminal further includes: determining whether the device of the emergency contact is registered on the DECT management system.

Specifically, the DECT management system determines whether the device of the emergency contact is registered on the DECT management system.

Further, when the device of the emergency contact is registered on the DECT management system, the DECT management system sends the location information to the second network base station connected to the device of the emergency contact. The DECT management system sends the location information by a DECT protocol, the SIP, code logic implementation, or the like, and a specific sending method is not limited herein. When the device of the emergency contact is not registered on the DECT management system, the DECT management system sends the location information to a server connected to the DECT management system. The server sends, by the SIP, the location information to the second network base station connected to the device of the emergency contact. The location information is sent in a form of a location field, and the server needs to support sending the location field.

In this embodiment, the location field is added to content displayed by the device of the emergency contact to display a location of the network base station connected to the DECT terminal of the alarm reporting person.

This embodiment has following beneficial effects:

A DECT management system collects and manages location information of a network base station connected to a terminal of an alarm reporting person, without relying on Bluetooth, GPS positioning, or other app functions that are only available on a smartphone. After alarm communication between the terminal of the alarm reporting person and a device of an emergency contact is established, only using an ordinary SIP server, the DECT management system can transmit an alarm signal and location information of the alarm reporting person to the device of the emergency contact through a network base station connected to the device of the emergency contact, without relying another specific third-party server. In addition, when the server supports sending a location field, the location information of the network base station connected to the DECT terminal can be sent to a remote device of the emergency contact by the SIP. In this case, there may be no limitation on whether the device of the emergency contact needs to be registered on the DECT management system, and a lower deployment requirement is imposed for the device of the emergency contact. Therefore, the transmission of the alarm signal and the location information of the alarm reporting person is not limited to a device within a designated range of a DECT system, and the solution is more scalable.

Embodiment 2

Figure 2:
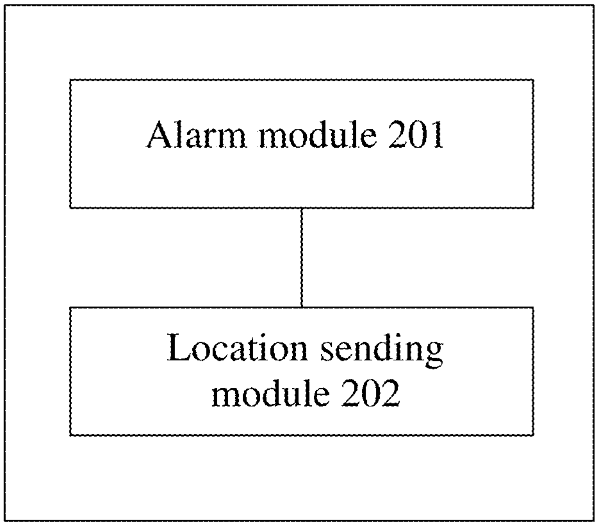
FIG. 2 is a schematic structural diagram of an alarm apparatus for a DECT terminal according to an embodiment of the present disclosure.

Referring to FIG. 2, an alarm apparatus for a DECT terminal according to an embodiment of the present disclosure includes an alarm module 201 and a location sending module 202.

The alarm module 201 is configured to: when an alarm function of the DECT terminal is triggered, record an account of the DECT terminal, match an emergency contact based on the account of the DECT terminal, and establish alarm communication with the emergency contact.

The location sending module 202 is configured to: after the alarm communication between the DECT terminal and the emergency contact is established, send location information of a network base station connected to the DECT terminal to a device of the emergency contact, such that the device of the emergency contact obtains an alarm call of the DECT terminal and displays the location information of the network base station connected to the DECT terminal.

Figure 5:
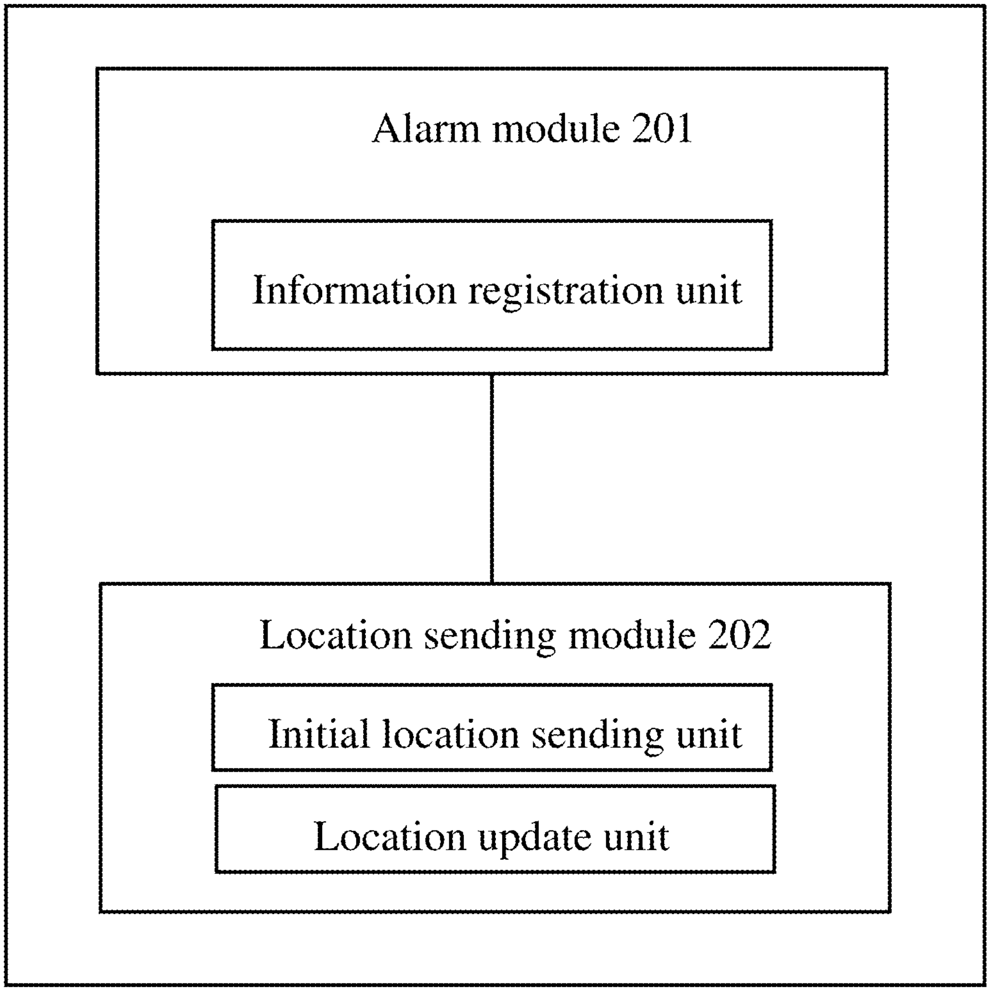
FIG. 5 is a schematic structural diagram of an alarm apparatus for a DECT terminal according to another embodiment of the present disclosure.

In this embodiment, referring to FIG. 5, the alarm module includes an information registration unit.

The information registration unit is configured to register at least one network base station in a DECT management system, and set information of the DECT terminal, a binding relationship between the DECT terminal and the emergency contact, and information and a corresponding alarm triggering mode of the device of the emergency contact.

The DECT management system includes at least one DECT management subsystem, the emergency contact includes an emergency contact registered on a same DECT management subsystem and an emergency contact registered on a different DECT management subsystem, and the device of the emergency contact includes a terminal registered on the DECT management system and a remote desktop phone or handle.

Preferably, the device of the emergency contact includes a handle registered on the DECT management system and a remote desktop phone or handle.

In this embodiment, the location sending module includes an initial location sending unit and a location update unit.

The initial location sending unit is configured to: after the alarm communication between the DECT terminal and the emergency contact is established, obtain location information of a first network base station connected to the DECT terminal, and send the location information to a second network base station connected to the device of the emergency contact, such that the second network base station sends the location information to the device of the emergency contact.

The location update unit is configured to: when the location information changes, send latest location information to the second network base station connected to the device of the emergency contact, such that the second network base station sends the latest location information to the device of the emergency contact.

In this embodiment, the first network base station connected to the DECT terminal is a first network base station with best signal strength to which the DECT terminal is connected.

In another implementation example, the foregoing alarm apparatus for a DECT terminal includes a processor. The processor is configured to execute the foregoing program modules and units stored in a memory, including the alarm module 201, the location sending module 202, the information registration unit, the initial location sending unit, and the location update unit.

The foregoing alarm apparatus for a DECT terminal can implement the alarm method for a DECT terminal in the foregoing method embodiment. The optional items in the foregoing method embodiment are also applicable to this embodiment, and are not elaborated herein again. For other content in this embodiment of the present disclosure, reference may be made to the content in the foregoing method embodiment, and details are not described in this embodiment again.

This embodiment has following beneficial effects:

The alarm apparatus for a DECT terminal in the present disclosure collects and manages, through a DECT management system, location information of a network base station connected to a terminal of an alarm reporting person. When an alarm function is triggered, the alarm module establishes alarm communication with an emergency contact. The location sending module only needs to use an ordinary SIP server to transmit an alarm signal and location information of the alarm reporting person to a device of the emergency contact through a network base station connected to the terminal of the alarm reporting person, neither relying on Bluetooth, GPS positioning, or other app functions that are only available on a smartphone, nor relying on another specific third-party server. In addition, when the server supports sending a location field, the location information of the network base station connected to the DECT terminal can be sent to a remote device of the emergency contact by the SIP. In this case, there may be no limitation on whether the device of the emergency contact needs to be registered on the DECT management system, and a lower deployment requirement is imposed for the device of the emergency contact. Therefore, the transmission of the alarm signal and the location information of the alarm reporting person is not limited to a device within a designated range of a DECT system, and the solution is more scalable.

Embodiment 3

Accordingly, the embodiments of the present disclosure further provide a computer-readable storage medium. The computer-readable storage medium includes a stored computer program, and the computer program is run to control a device on which the computer-readable storage medium is located to implement the alarm method for a DECT terminal in any one of the above embodiments.

For example, the computer program may be divided into one or more modules/units. The one or more modules/units are stored in the memory and executed by the processor to complete the present disclosure. The one or more modules/units may be a series of computer program instruction segments capable of implementing specific functions, and the instruction segments are used for describing an execution process of the computer program in the terminal device.

The terminal device may be a computing device such as a desktop computer, a notebook, a palmtop computer, or a cloud server. The terminal device may include, but not limited to, a processor and a memory.

The processor may be a Central Processing Unit (CPU), and may also be another general-purpose processor, a Digital Signal Processor (DSP), an Application Specific Integrated Circuit (ASIC), a Field-Programmable Gate Array (FPGA) or another programmable logic device, a discrete gate, a transistor logic device, a discrete hardware component, or the like. The general-purpose processor may be a microprocessor, or any conventional processor. The processor is a control center of the terminal device, and various parts of the whole terminal device are connected by various interfaces and lines.

The memory may be configured to store the computer program and/or modules. The processor implements various functions of the terminal device by running or executing the computer program and/or modules stored in the memory and invoking data stored in the memory. The memory may mainly include a program storage area and a data storage area. The program storage area may store an operating system, and an application required by at least one function; and the data storage area may store data that is created based on use of the mobile terminal, and the like. In addition, the memory may include a high-speed random access memory, and may further include a non-volatile memory, such as a hard disk, an internal storage, a plug-in hard disk, a Smart Media Card (SMC), a Secure Digital (SD) card, a Flash Card, at least one magnetic disk storage device, a flash memory device, or another volatile solid-state storage device.

The module or unit integrated in the terminal device, if implemented in a form of a software functional unit and sold or used as a stand-alone product, may be stored in a computer-readable storage medium. Based on such an understanding, all or some of processes for implementing the methods in the foregoing embodiments can be completed by a computer program instructing relevant hardware. The computer program may be stored in a computer-readable storage medium. The computer program is executed by a processor to perform the steps of the foregoing method embodiments. The computer program includes computer program code, and the computer program code may be in a form of source code, a form of object code, an executable file or some intermediate forms, and the like. The computer-readable medium may include: any physical entity or apparatus capable of carrying computer program code, a recording medium, a USB disk, a mobile hard disk drive, a magnetic disk, an optical disc, a computer memory, a Read-Only Memory (ROM), a Random Access Memory (RAM), an electrical carrier signal, a telecommunications signal, a software distribution medium, and the like.

The objectives, technical solutions, and beneficial effects of the present disclosure are further described in detail through the above specific embodiments. It should be understood that the above are merely some specific embodiments of the present disclosure, but are not intended to limit the protection scope of the present disclosure. It should be particularly noted that, any modifications, equivalent substitutions, improvements, and the like made by those skilled in the art within the spirit and principle of the present disclosure should be included within the protection scope of the present disclosure.

The invention claimed is:

1. An alarm method for a digital enhanced cordless telecommunications (DECT) terminal, comprising:

when an alarm function of the DECT terminal is triggered, recording an account of the DECT terminal, matching an emergency contact based on the account of the DECT terminal, and establishing alarm communication with the emergency contact; and after establishing the alarm communication between the DECT terminal and the emergency contact, sending location information of a network base station connected to the DECT terminal to a device of the emergency contact, such that the device of the emergency contact obtains an alarm call of the DECT terminal and displays the location information of the network base station connected to the DECT terminal;

wherein before the alarm function of the DECT terminal is triggered, the alarm method further comprises:

registering at least one network base station in a DECT management system, and setting information of the DECT terminal, a binding relationship between the DECT terminal and the emergency contact, and information and a corresponding alarm triggering mode of the device of the emergency contact.

2. The alarm method for a DECT terminal according to claim 1, wherein the DECT management system comprises at least one DECT management subsystem, the emergency contact comprises an emergency contact registered on a same DECT management subsystem and an emergency contact registered on a different DECT management subsystem, and the device of the emergency contact comprises a terminal registered on the DECT management system and a remote desktop phone or handle.

3. A computer-readable storage medium, wherein the computer-readable storage medium comprises a stored computer program, and the computer program is run to control a device on which the computer-readable storage medium is located to perform the alarm method for a DECT terminal according to claim 2.

4. The alarm method for a DECT terminal according to claim 1, wherein the sending location information of a network base station connected to the DECT terminal to a device of the emergency contact specifically comprises:

after establishing alarm communication between the DECT terminal and any emergency contact, obtaining location information of a first network base station connected to the DECT terminal, and sending the location information to a second network base station connected to the device of the emergency contact, such that the second network base station sends the location information to the device of the emergency contact; and when the location information changes, sending latest location information to the second network base station connected to the device of the emergency contact, such that the second network base station sends the latest location information to the device of the emergency contact.

5. A computer-readable storage medium, wherein the computer-readable storage medium comprises a stored computer program, and the computer program is run to control a device on which the computer-readable storage medium is located to perform the alarm method for a DECT terminal according to claim 4.

6. The alarm method for a DECT terminal according to claim 4, wherein the first network base station connected to the DECT terminal is a first network base station with best signal strength to which the DECT terminal is connected.

7. A computer-readable storage medium, wherein the computer-readable storage medium comprises a stored computer program, and the computer program is run to control a device on which the computer-readable storage medium is located to perform the alarm method for a DECT terminal according to claim 6.

8. A computer-readable storage medium, wherein the computer-readable storage medium comprises a stored computer program, and the computer program is run to control a device on which the computer-readable storage medium is located to perform the alarm method for a DECT terminal according to claim 1.

9. An alarm apparatus for a DECT terminal, comprising an alarm module and a location sending module, wherein the alarm module is configured to: when an alarm function of the DECT terminal is triggered, record an account of the DECT terminal, match an emergency contact based on the account of the DECT terminal, and establish alarm communication with the emergency contact; and the location sending module is configured to: after the alarm communication between the DECT terminal and the emergency contact is established, send location information of a network base station connected to the DECT terminal to a device of the emergency contact, such that the device of the emergency contact obtains an alarm call of the DECT terminal and displays the location information of the network base station connected to the DECT terminal;

wherein the alarm module comprises an information registration unit; and the information registration unit is configured to register at least one network base station in a DECT management system, and set information of the DECT terminal, a binding relationship between the DECT terminal and the emergency contact, and information and a corresponding alarm triggering mode of the device of the emergency contact.

10. The alarm apparatus for a DECT terminal according to claim 9, wherein the DECT management system comprises at least one DECT management subsystem, the emergency contact comprises an emergency contact registered on a same DECT management subsystem and an emergency contact registered on a different DECT management subsystem, and the device of the emergency contact comprises a terminal registered on the DECT management system and a remote desktop phone or handle.

11. The alarm apparatus for a DECT terminal according to claim 9, wherein the location sending module comprises an initial location sending unit and a location update unit; wherein the initial location sending unit is configured to: after the alarm communication between the DECT terminal and the emergency contact is established, obtain location information of a first network base station connected to the DECT terminal, and send the location information to a second network base station connected to the device of the emergency contact, such that the second network base station sends the location information to the device of the emergency contact; and the location update unit is configured to: when the location information changes, send latest location information to the second network base station connected to the device of the emergency contact, such that the second network base station sends the latest location information to the device of the emergency contact.

12. The alarm apparatus for a DECT terminal according to claim 9, wherein the first network base station connected to the DECT terminal is a first network base station with best signal strength to which the DECT terminal is connected.

* * * * *